United States Patent [19]
Sankar

[11] Patent Number: 5,903,756
[45] Date of Patent: May 11, 1999

[54] VARIABLE LOOKAHEAD PARSER GENERATOR

[75] Inventor: Sriram Sankar, Fremont, Calif.

[73] Assignee: Sun Microsystems, Incorporated, Palo Alto, Calif.

[21] Appl. No.: 08/730,494

[22] Filed: Oct. 11, 1996

[51] Int. Cl.⁶ .................................................... G06F 9/45
[52] U.S. Cl. ............................................................ 395/702
[58] Field of Search ................................. 395/701, 702, 395/707, 708

[56] References Cited

U.S. PATENT DOCUMENTS

| | | | |
|---|---|---|---|
| 5,276,880 | 1/1994 | Platoff et al. | 395/708 |
| 5,355,491 | 10/1994 | Lawlor et al. | 395/707 |
| 5,671,416 | 9/1997 | Elson | 395/702 |
| 5,675,801 | 10/1997 | Lindsey | 395/702 |

FOREIGN PATENT DOCUMENTS

92/03782  3/1992  WIPO ............................. G06F 9/45

Primary Examiner—James P. Trammell
Assistant Examiner—Matthew Smithers
Attorney, Agent, or Firm—Graham & James LLP

[57] ABSTRACT

A description language and a parser generator for top-down parsers allows grammars for top-down parsers to be defined using a sequence of productions written as extended BNF expressions. For productions that are ambiguous, a lookahead construct in the grammar allows the programmer to specify an increased number of lookahead tokens. The lookahead construct can be specified on an expansion-by-expansion basis. As a result, the generated parser only maintains an increased number of lookahead tokens when required to process ambiguous productions.

15 Claims, 7 Drawing Sheets

```
1    options {
2        STATIC = true;
3        LOOKAHEAD = 1;
4        DEBUG = false;
5        ERROR_REPORTING = true;
6        USER_TOKEN_MANAGER = false;
7        USER_CHAR_STREAM = false;
8        JAVE_UNICODE_ESCAPE = false;
9        UNICODE_INPUT = false;
10       CPLUSPLUS = fales;
11   }
12
13   PARSER_BEGIN (Simple1)
14
15       public class Simple1 {
16           public static void main (String args[1]) throws ParseError {
17               Simple1 parset = new Simple1 (system.in);
18               parser.input ();
19           }
20       }
21
22   PARSER_END (Simple1)
23
24   void Input () :
25   { int count = 0; }
26   {
27       count = MatchedBraces () <EOF>
28       { System.out.println ( "The level of nesting is: " + count ); }
29   }
30
31   void MatchedBraces () :
32   { int nested_count = 0 }
33   {
34       "{" [ nested_count = MatchedBraces () ] "}"
35       { return ++nested_count; }
36   }
```

```
1    static final public void Input () throws ParseError {
2            int count = 0
3            count = MatchedBraces ();
4            consume_token (7);
5            System.out.println ( "The level of nesting is: " + count );
6    }
```

```
1   PARSER_BEGIN (example)
2
3   class_example {
4   }
5
6   PARSER_END (example)
7
8   IGNORE_IN_BNF :
9   {}
10  {
11      " "
12  | "\t"
13  | "\n"
14  | "\r"
15  }
16
17  void StatementBlock () :
18  {}
19  {
20      "{"
21      ( Statement () ) *
22      "}"
23  }
24
25  void Statement () :
26  {}
27  {
28      LOOKAHEAD (2)
29      TypeName () VarName () ";"
30  |
31      VarName () "=" Expression () ";"
32  }
33
34  void TypeName () :
35  {}
36  {
37      <IDENTIFIER>
38  }
39
40  void VarName () :
41  {}
42  {
43      <IDENTIFIER>
44  }
45
46  void Expression () :
47  {}
48  {
49      <INDENTIFIER>
50  }
51
52  TOKEN :
53  {}
54  {
55      <INDENTIFIER:
56          ["a"-"z"] (["a"-"z"])*>
57  }
```

```
1   static final public void Statement () throws ParseError {
2       if _Jack2_2 (2) {
3           TypeName ();
4           VarName ();
5           consume_token (7);
6       } else if (_Jack2_3 (1)) {
7           VarName ();
8           consume_token (8);
9           Expression;
10          consume_token (7);
11      else {
12          token_error_setup (1);
13          throw new ParseError ();
14      }
15  }
```

VARIABLE LOOKAHEAD PARSER GENERATOR

FIELD OF THE INVENTION

The present invention relates generally to tools used for the construction of computer-executed translators, such as compilers and interpreters. More specifically, the present invention is a parser generator which allows a programmer to specify the number of lookahead tokens used when processing a particular construct.

BACKGROUND OF THE INVENTION

Parsers and parser generators are well known software tools. In general terms, a parser is a program which accepts data comporting with a source language. The input data generally includes words and symbols which comport with the source language and which are known collectively as tokens. The parser reads the tokens of the input data and matches sequences of tokens generally referred as constructs, with a set of rules known by the parser. As each construct is matched with a particular rule, the parser calls one or more actions associated with the matched rule. The process of matching constructs with rules and calling actions continues until the parser reaches the end of the input, or until a nonrecoverable error occurs in the input.

An example of a simple parser would be a parser which accepts a series of algebraic equations as an input which comports to a particular language. The parser would have a set of rules that represent various constructs of algebraic equations. For example, the parser would have a rule that would match constructs of the form "number+number" and another rule that would match construct of the form "number—number." As each construct is matched, the parser would perform the actions required by the particular construct matched. In the case of the construct "4-4", for example, the parser would call the actions required to generate the sum of sixteen.

Collectively, the set of rules implemented by a parser are known as a "grammar". Grammars can be organized using a tree-like hierarchy. At the top of the hierarchy, there are general rules. Conversely, the bottom of the hierarchy is composed of the most specific rules. For example, in the case of the parser for algebraic equations already discussed, the top of the hierarchy might be composed of a rule that indicates that the source data is composed of a series of separate algebraic equations. The next level of the hierarchy would include rules describing which components are required for a single equation. Still further down the hierarchy would be rules for the sub-components that are required for each component of an equation.

Typically, parsers use one of two related but different techniques. These techniques are known as "bottom-up parsing" and "top-down parsing." In the case of bottom-up parsers, rules in the grammar are matched by first finding those constructs in the parser input which match the rules at the lowest level of the hierarchy. These matching constructs are then combined to match rules at the next higher level of the hierarchy, and so on, until an entire rule is matched. In contrast, top-down parsers attempt to match the highest level rules in the hierarchy first. These parsers then work their way down the hierarchy, matching rules at successively lower levels.

In practice, parsers are used for far more than evaluating algebraic equations. In fact, parsers can be used for a wide range of source languages to perform a wide range of functions. For example, parsers are commonly used to direct the actions of compilers and interpreters. Parsers are also used to process configuration files and to process the headers of electronic mail as well as a variety of other purposes. Generally, these uses require source languages and actions which are considerably more complex than the source language and actions described for the simple example of a parser which evaluates algebraic equations. The complexity of these source languages and their associated actions means that the parsers themselves are often quite complex and, as a result, often difficult to design and implement.

The complexity of parsers has lead to the development of a number of different parser generators. Parser generators are tools which allow a programmer to define a grammar which corresponds to a particular source language. The programmer adds actions which correspond to the rules in the grammar and the parser generator uses the grammar and rules to construct a new parser. When complete, the new parser functions as a parser for the source language which includes both the rules and the actions which the programmer has defined.

Traditionally, most parser generators have produced bottom-up parsers. For example, the "Yet Another Compiler Compiler (yacc)" parser generator used in the UNIX operating system programming environment is a well known parser generator which produces bottom-up parsers. More recently, however, parser generators, which produce top-down parsers (such as the parser generator supplied with the Prudue Compiler Construction Tool Set (PCCTS)), have increased in popularity. This increase in popularity is due partially to the fact that the parsers produced by top-down parser generators are more intuitive to human engineers who attempt to locate and correct errors in such parsers. In addition, many programmers find the task of defining actions to be easier when the actions are designed to be used in a top-down parser.

Unfortunately, there are still a number of disadvantages associated with the use of parser generators. One such disadvantage is the potential of ambiguity within the parser grammar. More specifically, when a grammar is constructed for a source language, there will generally be rules that will have some degree of ambiguity. Ambiguity, in this case, means that a given sequence of tokens may match more than one rule within the grammar. This is problematic for the parser, since the parser will not know which rule to choose when the parser encounters a token sequence which matches more than a single rule.

Fortunately, most ambiguities may be solved by increasing the number of tokens considered by the parser at a given time. Thus, when the parser encounters a sequence of tokens which match more than one rule, the parser examines the tokens subsequent to the ambiguous token sequence. If the subsequent tokens are inconsistent with a rule which matches the ambiguous token sequence, that rule can be removed from consideration by the parser. The subsequent tokens used by the parser are known as lookahead tokens and the consideration of lookahead tokens is generally referred to as parser lookahead.

Traditionally, parser generators have provided a fixed number of lookahead techniques. As a result, the use of additional lookahead tokens to disambiguate grammars has not generally been possible. More recently, parser generators, have allowed programmers to specify an increased number of lookahead tokens using two different techniques. One technique is to allow the programmer defining the grammar to specify the number of lookahead tokens that must be maintained by the parser. This method causes the parser generator to construct a parser which always maintains the number of lookahead tokens specified by the programmer. Unfortunately, it is often the case that the number of lookahead tokens specified by the programmer will only be required for resolving disambiguities in a very small portion of the parser's rules. The remaining rules generally require few, if any, additional lookahead tokens. Since maintaining additional lookahead tokens is relatively time-consuming, parsers which maintain a specific number of lookahead tokens can be relatively inefficient.

The second technique employed by parser generators to deal with the problem of token lookahead is to employ what is generally known as infinite lookahead. Infinite lookahead is a technique which causes the parser to start accumulating lookahead tokens whenever it encounters a sequence of input tokens which may be matched by two or more rules. The process of accumulating input tokens continues until the parser is able to resolve the ambiguity. Unfortunately, the process of iteratively fetching lookahead tokens is also inefficient.

SUMMARY OF THE INVENTION

An embodiment of the present invention includes a method and apparatus for generating top-down parsers. In general terms, an embodiment of the present invention includes a description language for defining parser grammars and a parser generator. A programmer defines a parser grammar by expressing the grammar in terms of the description language. The grammar is then processed by the parser generator and the parser generator emits a Java™ code implementation of a parser corresponding to the grammar.

In more detail, the description language has a syntax and structure which is similar to the Java™ programming language. In the description language, "terminals" represent tokens received from a scanner or lexical analyzer. "Non-terminals", on the other hand, are defined as sequences of terminals and non-terminals. "Productions" are rules which give a name to a non-terminal and define the non-terminal in terms of terminals and non-terminals. The production starts with the name of a non-terminal followed by a colon which is followed, in turn, by an extended BNF expression that defines the non-terminal using terminals and non-terminals.

In many cases, productions can be defined which unambiguously relate a non-terminal to a sequence of terminals and non-terminals. In other cases, however, a non-terminal maps to two or more possible sequences of terminals and non-terminals. In cases of this type, the correct sequence of terminals and non-terminals can be determined by having the lexical analyzer fetch additional tokens, known as lookahead tokens. In accordance with the present invention, token lookahead is implemented using one of three techniques. In the first technique, a default amount of token lookahead is specified using a specialized construct in the parser grammar. This construct defines the number of lookahead tokens that are maintained by the parser at all times. In addition to specifying the default lookahead, a second type of specialized construct is defined and included in selected productions. The second type of specialized construct causes the generated parser to use so-called infinite lookahead when the parser is attempting to resolve ambiguities within the productions that include the second specialized construct. Finally, in other cases, a third type of specialized construct is defined and included as part of other selected products. This third specialized construct causes the generated parser to maintain a specified number of tokens when resolving ambiguities within productions that include the third specialized construct. For one embodiment of the present invention, an analysis tool may be used to automatically add the third type of lookahead construct to each ambiguous production within a language grammar. In other cases, these constructs can be added by the programmer defining the language grammar.

The language grammar defined using the description language becomes the input data for the parser generator. Based on the language grammar, the parser generator creates source code for a parser. The parser source code is preferentially emitted as Java™ source, although other languages, such as C or C++ are equally practical. In the case where Java™ source is emitted, the source code may then be partially compiled and executed. For other languages, full compilation as well as linking will generally be required. Importantly, each non-terminal defined in the language grammar is emitted as a callable procedure (in the case where Java™ source is emitted, each non-terminal is emitted as a Java™ method). This allows parsing to start with any non-terminal. Once compiled and, in some cases, linked, the executable parser for the language described in the language grammar is ready for use.

Advantages of the invention will be set forth, in part, in the description which follows and, in part, will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
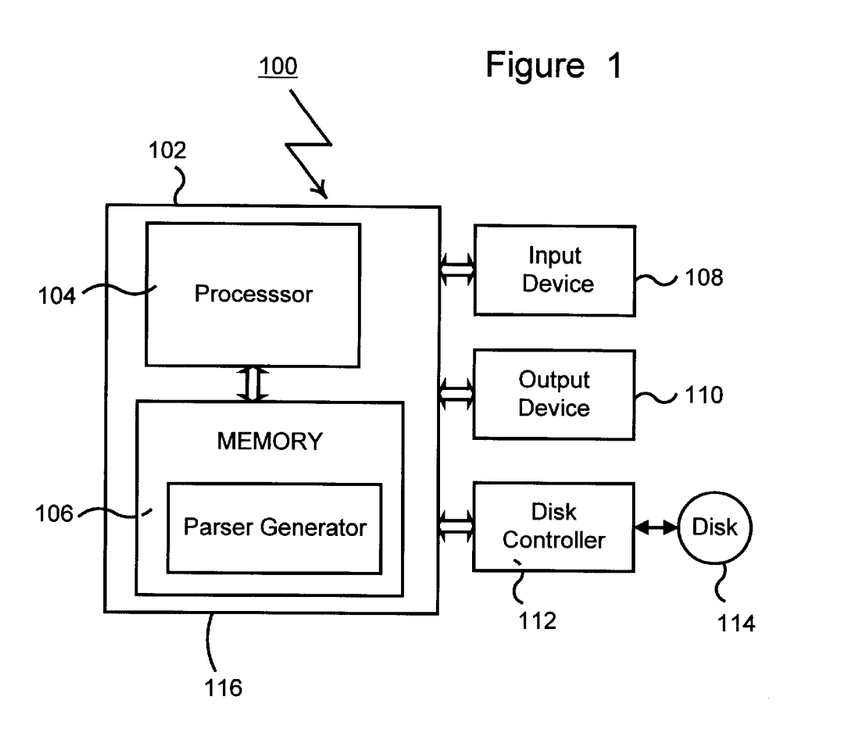
FIG. 1 is a block diagram of a data processing system in accordance with an embodiment of the present invention.

An embodiment of the present invention includes a method and apparatus for generating top-down parsers. In FIG. 1, a data processing system 100 is shown as a representative environment for the present invention. Structurally, the data processing system 100 includes a host computer 102 which, in turn, includes a central processing unit, or processor 104, and a memory 106. An input device 108 and an output device 110 are connected to the host computer 102 and represent a wide range of varying I/O devices such as disk drives, keyboards, modems, network adapters, printers and displays. FIG. 1 also shows that computer system 100 includes a disk controller 112 and a disk drive 114.

Figure 2:
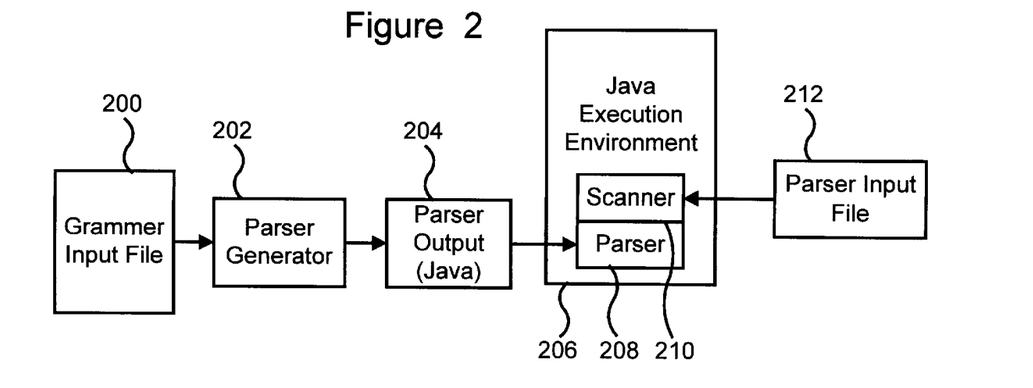
FIG. 2 is a block diagram showing creation of a parser using the parser generator and grammar input file of an embodiment present invention.

Structurally, and as shown in FIG. 2, an embodiment of the present invention includes a grammar input file 200 and a parser generator 202. The grammar input file 200 functions as the input for the parser generator 202. Using the grammar input file 200, the parser generator 202 constructs a parser output file 204, which is preferably a written in the Java™ programming language. The parser output file 204 is input into the Java™ Programming environment 206 where it becomes an executable parser 208. Optionally, the parser output file 204 may also include code which becomes a scanner 210 (scanners are also known as lexical analyzers and function to preprocess the input to the parser 208 by breaking the input into lexical tokens). Finally, an input file for the parser 208 is shown and designated 212. The input file 212 contains a computer program or other language that is to be processed by the parser 208.

Figure 3:
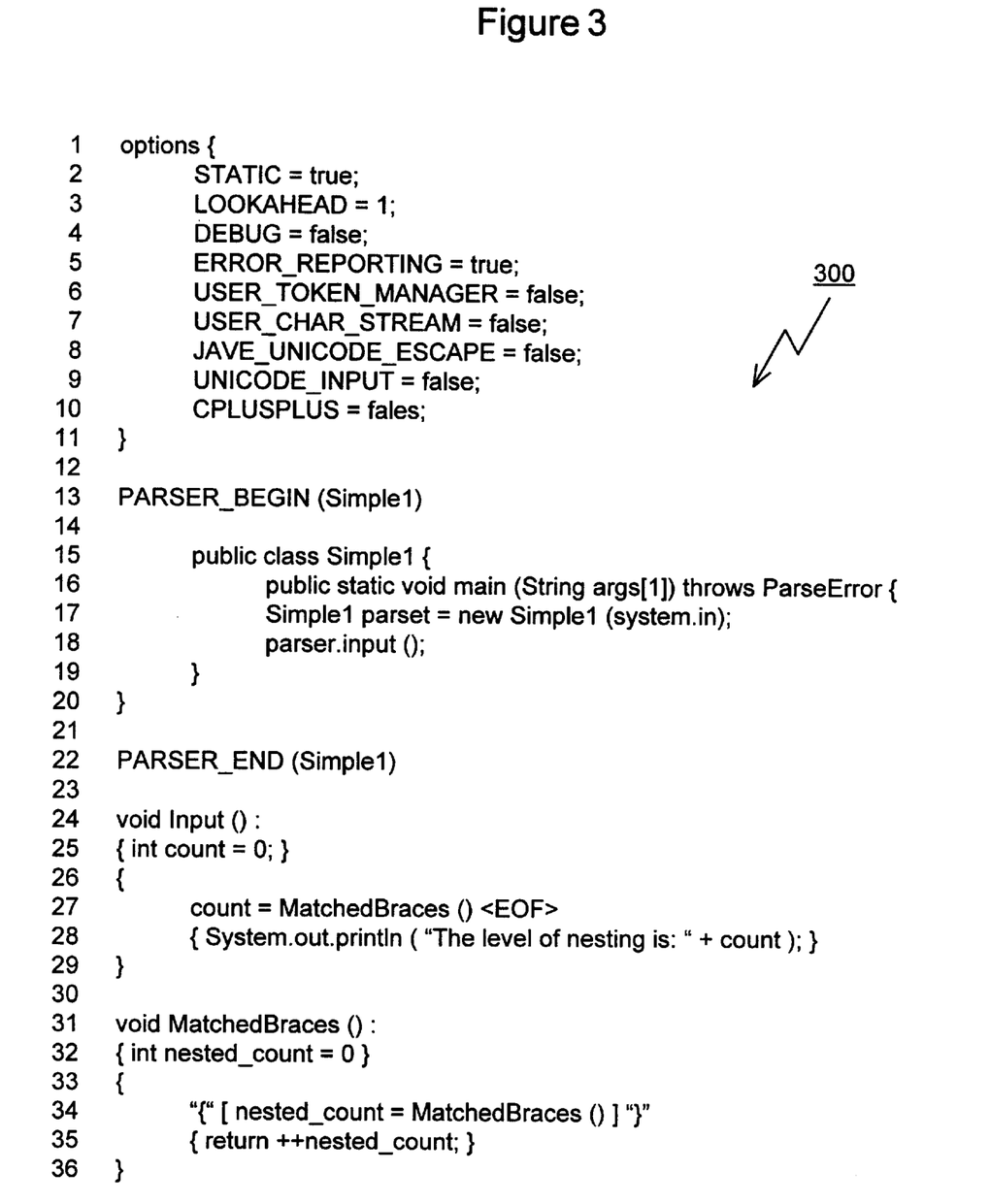
FIG. 3 is a listing of a sample input file for the parser generator of an embodiment present invention.

The details of the grammar input file 200 may be better appreciated by reference to FIG. 3 where a sample input file 200 is shown and designated 300. The grammar input file 300 is written in a description language which includes three main sections. In FIG. 3, the first of these sections corresponds to lines 1 through 11. This first section is an initialization section and provides the programmer with an area where certain options may be specified. In general, the majority of these options are of a general purpose nature and will not be discussed in detail. At least one of these options is, however, more germane to the discussion of the present invention. This option is the lookahead option of line three which allows the programmer to specify the number of lookahead tokens that will be maintained by the executable parser 208.

The second section of the sample input file 300 includes lines 13 through 22. This second section is a Java™ compilation unit and may be of arbitrary complexity. The constructs PARSER_BEGIN (name) and PARSER_END (name) are, however, required. The name included in these constructs will be used as a prefix for the output file 204 created by the parser generator 202 (In general, there may be more than a single file 204 created by the parser generator. For the purposes of description, however, a single file is referred to). It is also a requirement that the compilation unit include a definition for a Java™ class having the same name as the arguments to the constructs PARSER_BEGIN (name) and PARSER_END (name). For example in the case of the sample input file 300, it is required that the programmer include a definition for a class having a name "Simple1." The parser generator 202 partially emits this class definition and then emits the code implementing the parser 208. Finally, a closing brace is emitted to end the class definition. The result is that the code emitted by the parser generator 202 is syntactically and structurally included in the definition of the class defined by the programmer in the compilation unit.

The third section of the sample input file 300 includes lines 24 through 36. This third section includes a series of productions where each production has a left side and a right side with the left and right sides being separated by a colon. The left side of each production has a Java-like syntax and defines the name and type of a non-terminal. The right side begins with a declaration section enclosed by a first set of braces and ends with a set of expansions, enclosed by a second set of braces.

The parser generator 202 emits a Java™ method for each production. The contents of the declaration section of a specific production become part of the initial declarations in the method emitted for that production. For example, in the case of the production for "Input" the declaration sections (line 27 of FIG. 3) includes a declaration for an integer variable "count". The parser generator 202 will emit a method for Input and the method will include the declaration for count in the initial declarations of the method.

The expansions included in the second set of braces on the right hand side of each production are extended BNF expressions. These extended BNF expressions may include either non-terminals or terminals and have a form that is generally well known in computer science. For example, the following constructs are all valid ways of expressing an expansion:

"(expression)+" meaning one or more of an expression.
"(expression)" meaning zero or more of an expression.
"expression1| expression2" meaning expressions1 or expressions2.
"[expression]" meaning that expression is optional.

Each expansion is an alternative method for matching a set of terminals and non-terminals to some part of the input file 212. As an example, in FIG. 3, the lines 24 through 29 define a non-terminal "Input." Input has an expansion of "MatchedBraces" (another non-terminal) followed by the terminal <EOF>. The non-terminal MatchedBraces is defined by lines 31 through 36 and includes the expansion "{" optionally followed by MatchedBraces, followed by "}." The overall effect of these two productions is a grammar that recognizes sequences of braces (i.e., "{" and "}") where each opening brace is matched by a closing brace.

Figure 4:
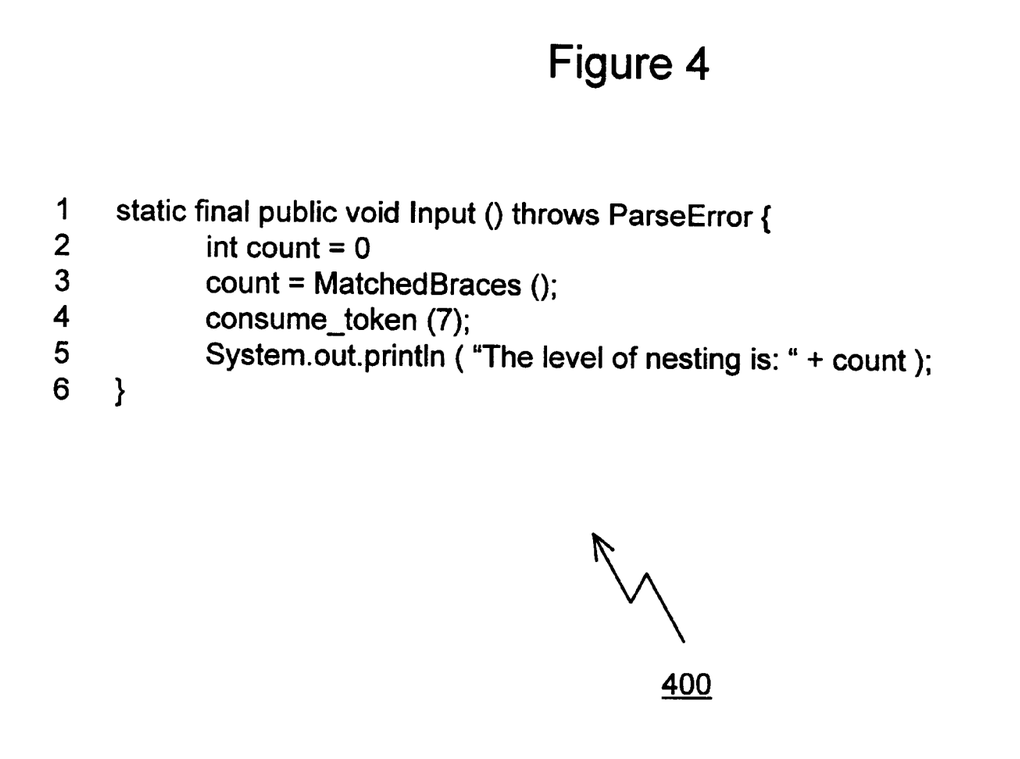
FIG. 4 a listing of a Java™ code method for a production in the input file of FIG. 3.

A method emitted for the production Input is shown in FIG. 4 and generally designated 400. Line 2 of method 400 declares the integer variable count. This corresponds to the contents of the declaration section described previously. After the declaration for count, method 400 first calls the method for MatchedBraces and then calls consume_token. These two calls correspond to the single expansion included in the production for Input (i.e., the expansion included at line 27 of FIG. 3). Finally, method 400 calls the system printing routine to print out the level of nesting encountered in the parsed input.

Several specialized productions are included in the description language of the present invention. These productions are "specialized" because, unlike normal productions, they do not define non-terminals. Instead, these productions cause the parser generator 202 to emit specialized code. One of these specialized productions is used for specifying terminals and has the form:

```
TOKEN:
{}
{
<first token name: regular epression>
|<second token name: regular expression>
. . .
|<nth token name: regular expression>
}
```

Inclusion of a production of this type causes the parser generator 202 to emit code which recognizes the specified tokens as terminals during lexical analysis (i.e., as part of the optional scanner 210 output by the parser generator 202). Each of the token names included in the production is also available in other productions in much the same way a non-terminal defined by a production would be.

A second type of specialized production appears as follows:

```
IGNORE_IN_BNF:
{}
{
" "
|"\t"
|"\n"
|"\r"
}
```

Inclusion of a production of this type causes the parser generator 202 to emit code which recognizes the specified tokens to be discarded during lexical analysis (i.e., as part of the optional scanner 210 output by the parser generator 202).

The parser generator 202 and description language of the grammar input file 200 also include a method for specifying a token lookahead on a expansion-by-expansion basis. This method is better understood by reference to FIG. 5 where a second sample input grammar is shown and generally designated 500. Input Grammar 500 includes many of the constructs explained above in the preceding sections. Thus, input grammar 500 includes examples of both of the specialized productions described above (the specialized productions appear in FIG. 5 at lines 52 through 57 and lines 8 through 15, respectively). Input grammar 500 also includes a series of productions at lines 17 through 23, 25 through 32, lines 34 through 38, lines 40 through 44 and lines 46 through 50.

Figure 5:
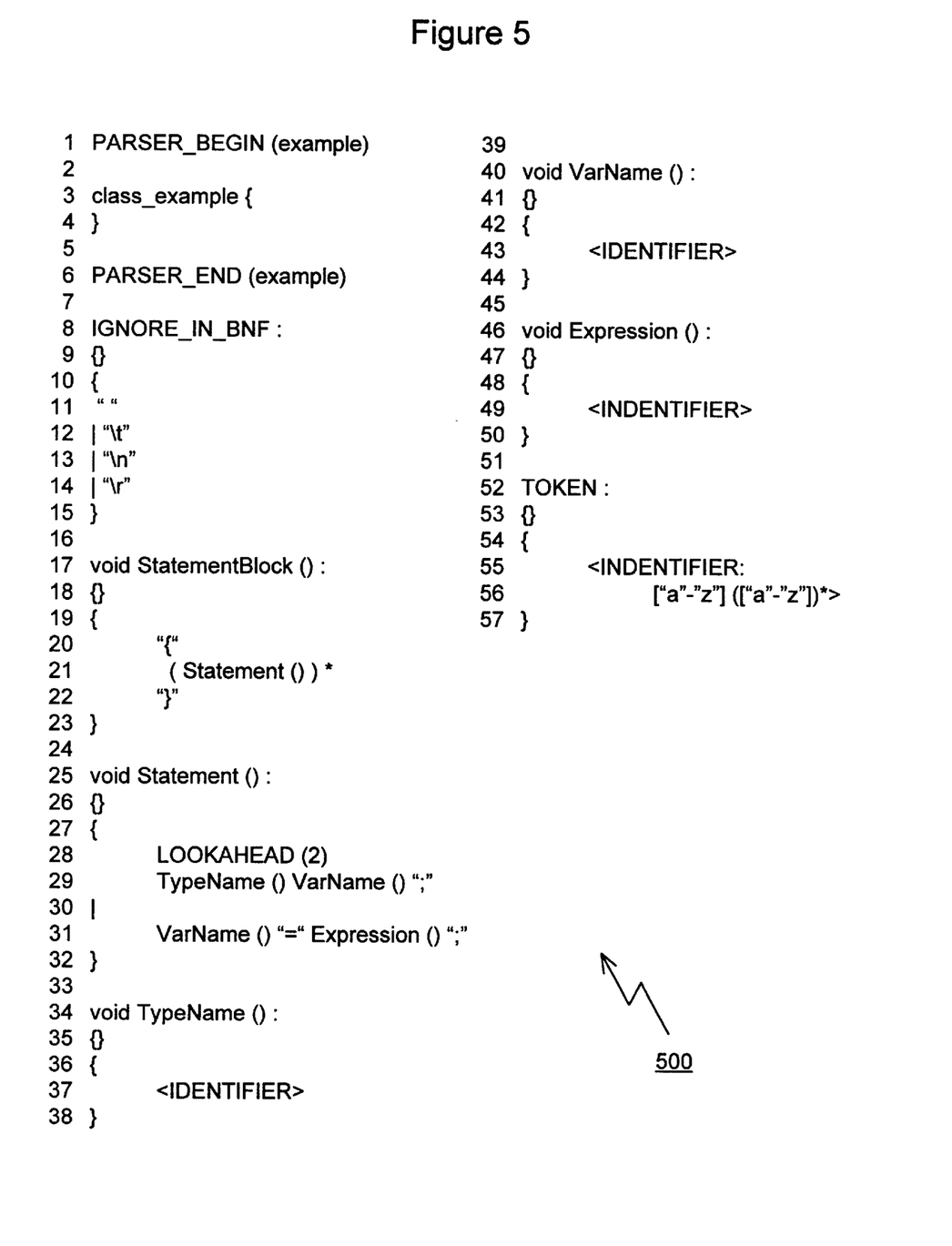
FIG. 5 is a listing of a second sample input file for the parser generator of an embodiment present invention.

One of these production (i.e., production at lines 25 through 32) defines a non-terminal with the symbolic name "Statement." The expansion portion of the right hand side of the production for Statement indicates that Statement may expand using two different rules. The first expansion for Statement is the non-terminal "TypeName", followed by the non-terminal "VarName" followed by the terminal ';'. The second expansion for Statement is the non-terminal "VarName" followed by the terminal '=' followed by the non-terminal "Expression." Examination of the productions for VarName, TypeName and Expression indicates that each of these non-terminals expands to the terminal "IDENTIFIER." As a result, it may be concluded that the non-terminal Statement expands to sequences of the form "IDENTIFIER IDENTIFIER;" or to sequences of the form "IDENTIFIER=IDENTIFIER."

Based on the foregoing, it is not difficult to appreciate that the production for Statement is somewhat ambiguous. More specifically, it is clear that after the terminal IDENTIFIER has been scanned, each of the two expansions for Statement is equally likely. In fact, without retrieving a second token, there is no practical method by which a parser implementing the production for statement may choose between the expansions for Statement.

To overcome this difficulty, the description language of the present invention allows the programmer to specify the number of lookahead tokens maintained by the parser 208 on a expansion-by-expansion basis. This is done by including a construct "LOOKAHEAD" in the description language. For example, in the case of the production for Statement, the LOOKAHEAD construct is included at line 28, just preceding the first expansion for Statement. In this case, the LOOKAHEAD construct is included with an argument of two. As a result, the parser generator 202 will generate a parser 208 that, when attempting to match the first expansion of the production for Statement, will maintain two lookahead tokens. Two lookahead tokens are, of course, adequate for disambiguating the two expansions for Statement.

Figure 6:
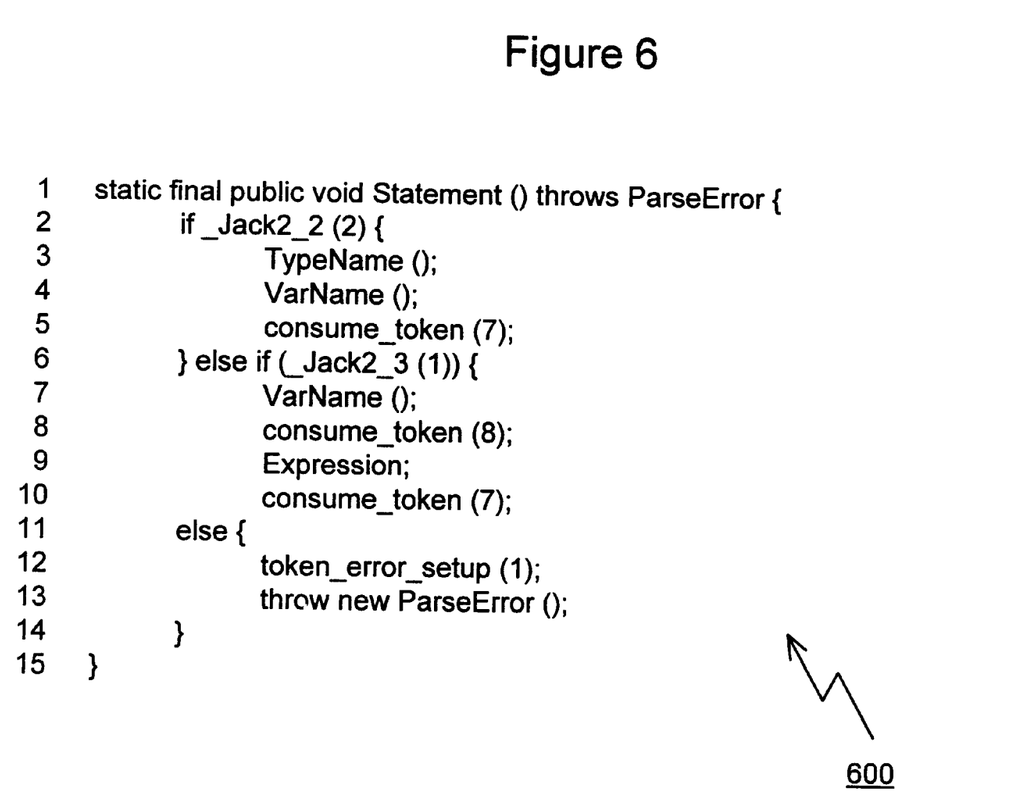
FIG. 6 is a listing of a Java™ code method for a production in the input file of FIG. 5.
Figure 7:
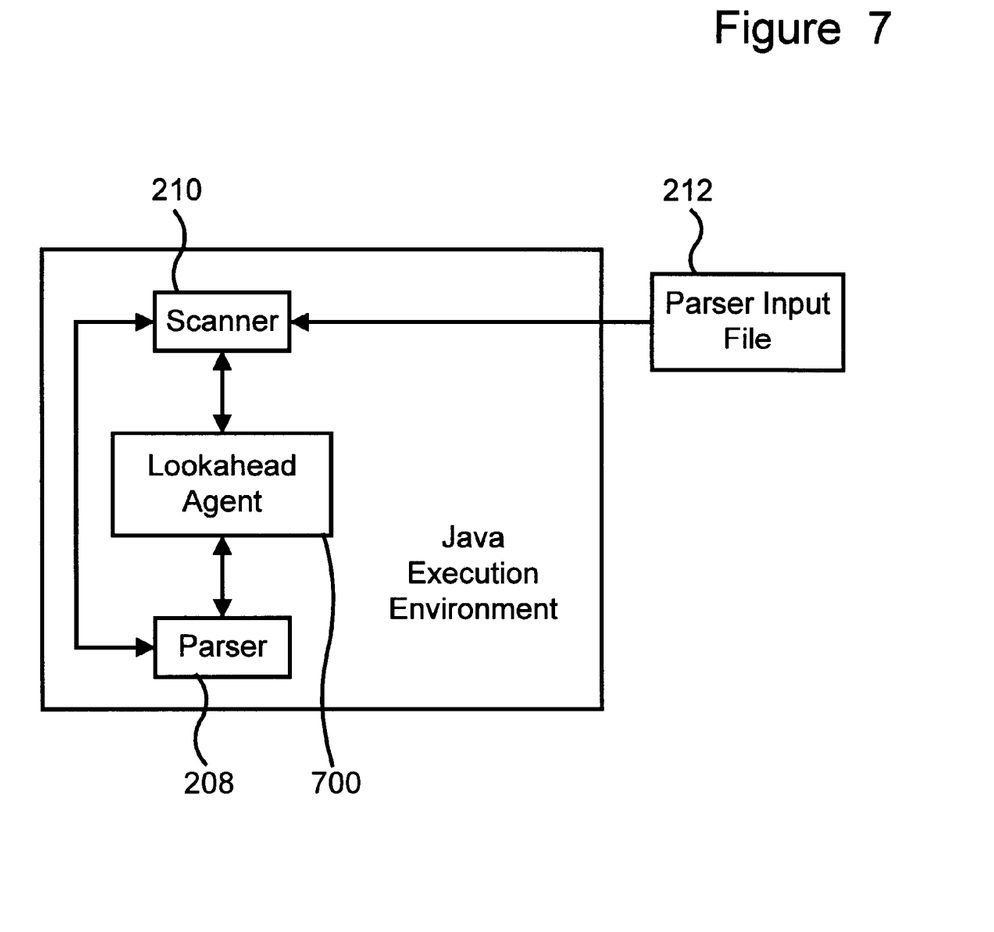
FIG. 7 is a block diagram showing the relationship between the parser, scanner and lookahead agent of an embodiment present invention.

In FIG. 6, the Java™ code output by the parser generator 202 for the production Statement (i.e., a portion of file 204) is shown and generally designated 600. In FIG. 6, it may be seen that the Java™ code 600 output by the parser generator 202 defines a Java™ method Statement which corresponds to the production for Statement. At line 2, a call to a lookahead agent call appears with the form _Jack2_2 (2). The argument of "2" to the lookahead agent informs the lookahead agent that two tokens of lookahead are required to parse using the expansion "Typename VarName." The interaction between the parser 208 and the lookahead agent may be better appreciated by reference to FIG. 7 where the lookahead agent 700 is shown positioned to communicate with both the parser 208 and the scanner 210. When necessary, the parser 208 communicates with the lookahead agent 700 and causes the lookahead agent 700 to request additional lookahead tokens from the scanner 210.

The next three lines of the Java™ method (i.e., lines 3 through 5 of FIG. 6) correspond to the calling of the method for Typename (at line 3), followed by the method for VarName (at line 4), and a call to consume_token (at line 5). The combined effect of these three lines is to process the entire expansion of "TypeName VarName;" and to discard the terminal ';'.

At line 6, a second call to a lookahead agent appears with the form _Jack2_3 (1). In this case, the argument to the lookahead agent indicates that a single token of lookahead is required to parse the expansion "VarName=TypeName." Following the call to the lookahead agent are a call to method for VarName (at line 7), a call to the method for Expression (at line 9) and two calls to consume_token (at lines 8 and 10). The combined effect of these four lines is to process the entire expansion of "VarName=TypeName;" and to discard the terminals '=' and ';'.

The LOOKAHEAD construct included in the production for Statement may also be included without an argument. In cases of this type, code is added to the Java™ method of the parser 208 which implements the corresponding method (i.e., the method for Statement) which causes the method to call a lookahead agent using infinite lookahead. Infinite lookahead causes the lookahead agent to iteratively fetch tokens, without limit, until a disambiguating token is retrieved. Thus, the description language of the present invention includes three different method for specifying token lookahead. The first method is to specify a default amount of token lookahead in the specification section of the grammar input file as discussed with reference to FIG. 3. Alternatively, the amount of token lookahead may be defined on a expansion-by-expansion basis as described in reference to FIGS. 5 and 6. Finally, as just described, infinite lookahead may be assigned to any expansion.

Figure 8:
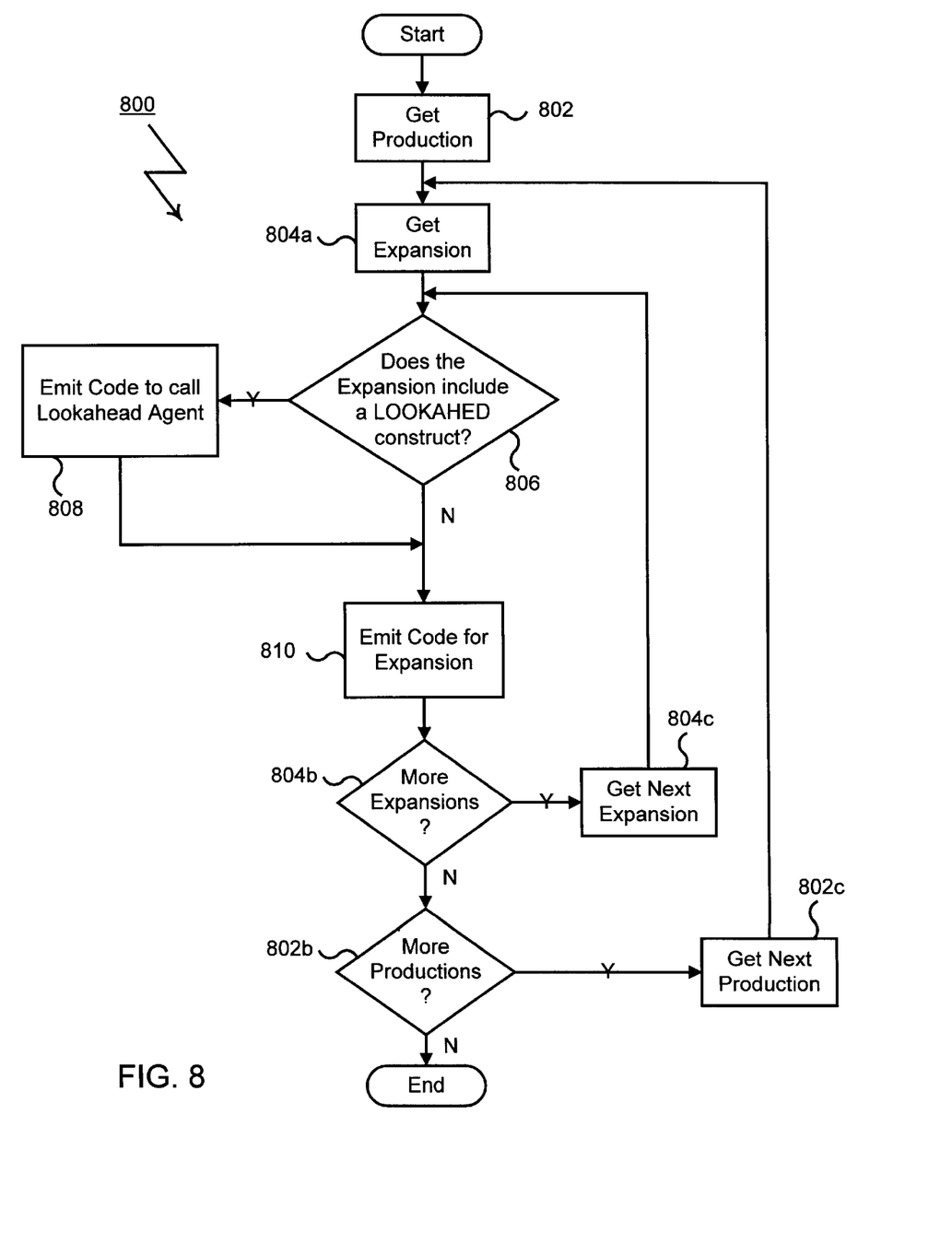
FIG. 8 is a block diagram showing the processing of LOOKAHEAD constructs by the parser generator of an embodiment present invention.

FIG. 8 shows a method 800 associated with the processing of the LOOKAHEAD constructs. More specifically, method 800 includes two nested loops. The outer most of these loop includes step 802a through 802c which iterate through each production in an input grammar. The inner loop, which includes steps 804a through 804c iterates through each expansion included in each of the productions. Inside of loop 804, a test is made at step 806 for the presence of the LOOKAHEAD construct. If the test is positive, execution continues at step 808 where code which calls the lookahead agent is added to the code being output by the parser generator 202. In step 910, the code which corresponds to the expansion selected by loop 804 is emitted. Thus, code for each expansion is emitted, and code which calls the lookahead agent is added when required.

For one embodiment of the present invention, the LOOKAHEAD constructs are added by the programmer as part of the process of creating the grammar input file 200. Preferably, however, the LOOKAHEAD constructs are added by an analysis program that examines each production included in the grammar input file 200. This analysis program selectively expands each production in the grammar input file 200 and stops the expansion when it has been determined that the production is unambiguous. The analysis program then adds the appropriate LOOKAHEAD constructs to the grammar input file 200.

Other embodiments will be apparent to those skilled in the art from consideration of the specification and practice of the invention disclosed herein. It is intended that the specification and examples be considered as exemplary only, with a true scope of the invention being indicated by the following claims and their full range of equivalents.

What is claimed is:

1. A method for creating a top-down parser, the method comprising the steps of:

providing an input grammar, the input grammar including a one or more productions with each production including one or more expansions for transforming terminals and non-terminals into non-terminals, the one or more productions including at least one ambiguous production, each ambiguous production including a lookahead construct specifying the number of lookahead tokens required to disambiguate the ambiguous production; and processing the input grammar using a parser generator, the parser generator emitting source code for the top-down parser, the source code including code corresponding to each production, the source code corresponding to each ambiguous production including code causing the parser to maintain the number of lookahead tokens specified by the lookahead token of that production.

2. A method as recited in claim 1 wherein the step of processing the input grammar using a parser generator further comprises the step of emitting a Java™ method for each production in the input grammar.

3. A method as recited in claim 2 wherein the step of processing the input grammar using a parser generator further comprises the step of emitting a call to a lookahead agent as part of each Java™ method for each ambiguous production in the input grammar.

4. A method as recited in claim 1 further comprising the step of processing the input grammar to emit source code for a lexical analyzer, the source code for the lexical analyzer including code corresponding to each terminal included in the input grammar.

5. A method for creating a top-down parser, the method comprising the steps of:

providing an input grammar, the grammar including a one or more productions with each production including one or more expansions for transforming terminals and non-terminals into non-terminals; and processing the input grammar using an analysis tool to yield the top-down parser, the analysis tool detecting productions which are ambiguous, the analysis tool adding a lookahead construct to each ambiguous production, the lookahead construct specifying the number of lookahead tokens required to disambiguate the ambiguous production.

6. A method as recited in claim 5 further comprising the step of:

processing the input grammar using a parser generator, the parser generator emitting source code for a parser, the source code including code corresponding to each production, the source code corresponding to each ambiguous production including code causing the parser to maintain the number of lookahead tokens specified by the lookahead token of that production.

7. A method as recited in claim 6 wherein the step of processing the input grammar using a parser generator further comprises the step of emitting a Java™ method for each production in the input grammar.

8. A method as recited in claim 7 wherein the step of processing the input grammar using a parser generator further comprises the step of emitting a call to a lookahead agent as part of each Java™ method for each ambiguous production in the input grammar.

9. A method as recited in claim 5 further comprising the step of processing the input grammar to emit source code for a scanner, the source code for the scanner including code corresponding to each terminal included in the input grammar.

10. A computer program product comprising:

a computer usable medium having computer readable code embodied therein for analyzing an input grammar describing a source language to create a top-down parser, the computer program product including:

first computer readable program code devices configured to cause a computer to analyze productions within the input grammar where each production, includes one or more expansions corresponding to sequences of terminals and non-terminals in the source language, the first computer readable program code devices further configured to cause the computer to emit code for each production in the input grammar, the code emitted for each production executable by a computer to recognize the sequences of terminals and non-terminals in the source language which correspond to the expansions included in the production; and second computer readable program code devices configured to cause the computer to recognize lookahead constructs in the input grammar, each lookahead construct associated with a production, each lookahead construct specifying a number of lookahead tokens which are to be used by the top-down parser when processing the production, the second computer readable program code devices further configured to cause the computer to emit code executable by a computer to cause the top-down parser to maintain the specified number of lookahead tokens when processing the associated production.

11. A computer program product as recited in claim 10 further comprising third computer readable program code device configured to cause the computer to analyze terminals in the input grammar, the third computer readable program code device further configured to cause the computer to emit code for a lexical scanner for each terminal in the input grammar.

12. A computer program product as recited in claim 10 wherein the first computer readable program code devices are configured to cause the computer to emit a Java™ method for each production in the input grammar.

13. An apparatus for processing an input grammar for a source language to create a top-down parser for the source language, the apparatus comprising:

a first portion configured to analyze productions in the input grammar where each production Includes one or more expansions corresponding to sequences of terminals and non-terminals in the source language, the first portion emitting code for each production in the input grammar, the code emitted for each production executable by a computer to recognize the sequences of terminals and non-terminals in the source language which correspond to the expansions included in the production; and a second portion configured to recognize lookahead constructs in the input grammar, each construct associated with one of the productions, each construct specifying a number of lookahead tokens which are to be used by the top-down parser when processing the production, the second portion emitting code executable by a computer to cause the top-down parser to maintain the specified number of lookahead tokens when processing the associated production.

14. A method for creating a top-down parser for a source language, the method comprising the steps of:

analyzing productions in an input grammar where each production includes one or more expansions corresponding to sequences of terminals and non-terminals in the source language;

emitting code for each production in the input grammar, the code emitted for each production executable by a computer to recognize sequences of terminals and non-terminals in the source language;

recognizing lookahead constructs in the input grammar, each construct associated with one of the productions, each construct specifying a number of lookahead tokens which are to be used by the parser when processing the production; and emitting code executable by a computer to cause the top-down parser to maintain the specified number of lookahead tokens when processing the associated production.

15. A method as recited in claim 14 further comprising the step of processing the input grammar using an analysis tool, the analysis tool detecting productions which are ambiguous, the analysis tool adding a lookahead construct to each ambiguous production, the lookahead construct specifying the number of lookahead tokens required to disambiguate the ambiguous production.

* * * * *